(12) United States Patent
Ufer et al.

(10) Patent No.: US 12,522,443 B2
(45) Date of Patent: Jan. 13, 2026

(54) DEVICE FOR STORING PACKAGES, AND METHOD FOR STORING PACKAGES

(71) Applicants: Michael Ufer, Malberg (DE); Markus Kiefel, Elben (DE)

(72) Inventors: Michael Ufer, Malberg (DE); Markus Kiefel, Elben (DE)

(73) Assignee: AMI Förder—und Lagertechnik GmbH, Luckenbach (DE)

( * ) Notice: Subject to any disclaimer, the term of this patent is extended or adjusted under 35 U.S.C. 154(b) by 91 days.

(21) Appl. No.: 18/391,836

(22) Filed: Dec. 21, 2023

(65) Prior Publication Data

US 2024/0124247 A1    Apr. 18, 2024

Related U.S. Application Data

(63) Continuation of application No. PCT/EP2022/065470, filed on Jun. 8, 2022.

(30) Foreign Application Priority Data

Jun. 22, 2021 (DE) .................... 10 2021 116 079.0

(51) Int. Cl.
*B65G 47/14* (2006.01)
*B65B 5/10* (2006.01)
*B65G 43/08* (2006.01)
*B65G 69/16* (2006.01)

(52) U.S. Cl.
CPC ............ *B65G 47/1442* (2013.01); *B65B 5/10* (2013.01); *B65G 43/08* (2013.01); *B65G 69/16* (2013.01); *B65G 2201/0285* (2013.01)

(58) Field of Classification Search
CPC ........... B65B 5/101; B65B 5/108; B65B 5/08; B65G 47/1442; B65G 43/08; B65G 69/16; B65G 2201/0285
USPC ....................................................... 198/618
See application file for complete search history.

(56) References Cited

U.S. PATENT DOCUMENTS 11,027,922 B1    6/2021    Kayal et al.
2022/0097973 A1*  3/2022    Grafe ..................... B65G 65/32

FOREIGN PATENT DOCUMENTS

| DE | 2918840 A1 | 11/1980 | |
|----|------------|---------|---|
| DE | 102008039099 A1 | 3/2010 | |
| DE | 102011080441 A1 | 2/2013 | |
| DE | 202014003528 U1 * | 7/2014 | ........... G07F 7/0609 |
| DE | 102017212124 A1 | 1/2019 | |

(Continued)

*Primary Examiner* — James R Bidwell
(74) *Attorney, Agent, or Firm* — Reinhart Boerner Van Deuren P.C.

(57) ABSTRACT

A device for storing packages, in particular parcels, for arrangement on a conveyor line is disclosed. The device includes at least one receiver arranged at least partially between at least two fastening elements, the receiver having at least one receiving surface for arranging the packages on the receiving surface, at least one first detector for measuring inflow data indicative of the inflow of packages to the receiver, and at least one controller for controlling a change of the at least one receiving surface. The at least one controller changes the at least one receiving surface of the at least one receiver depending on the inflow data measured by the at least one first detector. Also disclosed is a method for storing packages, in particular parcels, preferably by the aforementioned device.

14 Claims, 5 Drawing Sheets

(56) References Cited

FOREIGN PATENT DOCUMENTS

| | | |
|---|---|---|
| DE | 102019204536 A1 | 10/2020 |
| EP | 2686260 A1 | 1/2014 |
| EP | 3712092 A1 | 9/2020 |
| JP | H09208043 A | 8/1997 |
| JP | 2002284344 A | 10/2002 |
| WO | 2007140491 A1 | 12/2007 |

\* cited by examiner

DEVICE FOR STORING PACKAGES, AND METHOD FOR STORING PACKAGES

CROSS-REFERENCE TO RELATED PATENT APPLICATIONS

This patent application is a continuation of PCT/EP2022/065470, filed Jun. 8, 2022, which claims priority to German Application No. 10 2021 116 079.0, filed Jun. 22, 2021, the entire teachings and disclosure of both applications are incorporated herein by reference thereto.

FIELD OF THE INVENTION

The invention relates to a device for storing packages, in particular parcels, for arrangement on a conveyor line, including at least one receiving means arranged between at least two fastening elements, the receiving means having at least one receiving surface for arranging the packages on the receiving surface. The invention also relates to a method for storing packages, in particular by means of an aforementioned device.

BACKGROUND OF THE INVENTION

Devices for storing packages of the type in question are also referred to as goods storage devices. These are usually arranged at a discharge station or at an exit of a conveyor belt, whereby the discharged packages can be stored by means of the goods storage device until an operator removes the packages from the device for storing the packages for further processing.

So-called cascade chutes are known from the state of the art as devices for storing packages. However, these do not allow sufficient use of the available space, as the packages to be stored are often stacked one behind the other on the cascade chute and therefore only a small number of packages can be stored. Furthermore, high pressing forces act on the packages at the foot of the chute due to the packages moving behind, making it difficult to remove the packages and creating the risk that the packages arranged at the foot of the chute could be damaged.

It is also known to use devices with a base that can be displaced against a spring force. However, this is particularly disadvantageous in that the weight of the packages does not necessarily allow conclusions to be drawn about the dimensions or the volume of the packages used, as is the case with small heavy or large light packages, for example. In this respect, such devices also do not allow reliable use of the available space.

SUMMARY OF THE INVENTION

On this basis, the present invention is based on the task of providing a device and a method for storing packages which enable reliable storage of a sufficient number of packages and ergonomic removal of the stored packages.

According to a first aspect of the invention, the aforementioned problem is solved by a device of the type mentioned at the beginning, wherein the device comprises at least one receiving means arranged between at least two fastening elements, wherein the receiving means has at least one receiving surface for arranging the packages on the receiving surface. Furthermore, the device comprises at least one first detection means for measuring inflow data indicative of the inflow of packages to the receiving means and at least one control means for controlling a change in the at least one receiving surface. In this case, the at least one control means changes the at least one receiving surface of the at least one receiving means depending on the inflow data measured by the at least one first detection means.

This allows the receiving surface provided by the device to be changed depending on the inflow of packages and thus adapted to the respective requirements. This enables the reliable storage of a sufficient number of packages by providing a large capacity. The packages arranged on the receiving surface can also be ergonomically removed by an operator, as the receiving surface can be changed depending on the packages arranged on it.

A package can refer to the entirety of packaged goods and packaging. In particular, a package is a parcel. A package can also be a plurality of individual packages or a plurality of individual packages with packaged goods contained therein. It is also possible that a package is merely a single component that is transported by a conveyor line as part of a production process, for example, and is still unpackaged.

Preferably, the device is particularly suitable for being arranged at a discharge station or at an exit of a conveyor line. For this purpose, the device preferably has a profile, in particular a locking profile, by means of which the device can be connected to a conveyor line. This allows the device for storing packages to be positioned precisely and securely on the conveyor line.

Furthermore, it is preferable that the device for storing packages can be connected to a conveyor line by means of a communication means. Such a communication means can be used to connect the package storage device to a control system of the conveyor line and to supply it with power. In particular, the communication means is a so-called Harting connector.

The at least one receiving means can be connected directly or indirectly to the at least two fastening elements. The at least one receiving means can be arranged at least partially between the at least two fastening elements.

Preferably, the receiving means defines at least one receiving surface on which the packages to be stored can be arranged. Furthermore, it is preferred that the receiving surface does not form a flat surface, but rather has at least one convex curvature. This enables reliable storage of the packages, as they are additionally secured in the receiving means by means of the curvature. In addition, the curvature of the receiving surface can increase the maximum number of packages that can be stored.

A change in the receiving surface may, in particular, involve an increase and/or a reduction in the receiving surface of the receiving means. It is also possible for the change in the receiving surface to involve, for example, a change in height or a change in the curvature of the receiving surface, to name a few non-limiting examples.

The at least one detection means is designed in particular as a sensor that can measure inflow data indicative of the inflow of packages to the receiving means. Such a sensor can, for example, be a camera sensor, an infrared sensor, a weight sensor or a light barrier, to name a few non-limiting examples.

The inflow data can be data that specifies certain characteristics of the inflow of packages to the receiving means. This can be, for example, the size, number and/or frequency of the inflowing packages, to name a few non-limiting examples. In particular, inflow data is data that is indicative of the number of inflowing packages. For example, the at least one first detection means detects when a new package flows to the receiving surface of the receiving means.

The control means is preferably connected to the at least one first detection means and has, for example, a CPU, main memory, a circuit board and an interface for connecting the control means to the at least one first detection means. The control means can also be connected to an internal data carrier connected to the circuit board or connected to an external data carrier via the interface. In particular, it is preferred that the control means communicates with an actuator for changing the receiving surface of the receiving means by means of the interface.

A preferred embodiment is characterized in that at least a first of the at least two fastening elements is designed as a winding roll, wherein the receiving means can be at least partially wound onto the winding roll, and in that the control means changes the at least one receiving surface of the at least one receiving means by unwinding and/or winding the winding roll. By unwinding and/or winding the winding roll, the receiving surface can be changed in a reliable manner as a function of the packages to be stored. Preferably, the winding roll is cylindrical and can be wound and unwound by means of an actuator connected to the control means. For example, the winding roll can be connected to an actuator in the form of an electric motor via a gearbox.

Preferably, the winding roll has a sensor for detecting a winding status of the receiving means, wherein the sensor for detecting the winding status is connected to the control means. If the sensor detects that the receiving means is completely unwound, in particular over a certain period of time, such as at least 5 seconds, in particular at least 2.5 seconds, the control means can communicate to an operator via the interface that the receiving means is completely occupied by packages and that these packages must be removed from the device for storing packages.

According to a further preferred embodiment, the inflow data comprises the number of incoming packages and the at least one control means unwinds the at least one winding roll for a minimum duration when the number of incoming packages increases. Accordingly, the winding roll is always unwound for a minimum duration when a package is fed to the device. Preferably, unwinding for a minimum duration is only triggered when the package is completely positioned on the receiving surface. Unwinding for a minimum duration ensures that the receiving surface is sufficiently enlarged by the unwinding process. The minimum duration can, for example, be a duration in the range between 0.1 and 10 seconds, in particular between 0.25 and 5 seconds, especially preferably between 0.5 and 2.5 seconds.

A further preferred embodiment is characterized in that the at least one first detection means is designed as at least one first light barrier, wherein the packages interrupt the at least one first light barrier when the packages flow to the at least one receiving means and/or in that from an interruption duration of the first light barrier of more than 0.1 seconds, in particular of more than 0.25 seconds, particularly preferably of more than 0.5 seconds, the at least one control means unwinds the at least one unwinding roll to enlarge the receiving surface. With the aid of a light barrier, it is possible to determine in a structurally advantageous manner when an additional package enters the device. The fact that the winding roll is only unwound once the first light barrier has been interrupted for a certain period of time means that it is not necessary to regulate the receiving means in the event that the light barrier is interrupted, for example by an operator or by very small packages. The light barrier preferably comprises at least one light transmitter and at least one light receiver. It is also possible that the light barrier has at least one mirror for reflecting the transmitted light. In particular, it is preferred that the axis formed by the light barrier is essentially orthogonal to a conveying direction of the device. It is preferred that the minimum duration for unwinding the receiving surface is only triggered when the package fed in no longer interrupts the light barrier.

According to a further preferred embodiment, the device also has at least one further detection means for detecting arrangement data indicative of the arrangement of packages arranged on the receiving surface, wherein the at least one control means additionally changes the at least one receiving surface of the at least one receiving means as a function of the arrangement data measured by the at least one further detection means. In this way, the control means can additionally regulate the receiving surface depending on how the packages stored on the receiving surface are arranged. The arrangement data can include, for example, the distribution of the packages on the receiving surface. In particular, the arrangement data is data that includes the arrangement and/or fill level of packages already arranged on the receiving surface. The at least one further detection means may in particular be a sensor, such as a camera sensor, an infrared sensor, a weight sensor or a light barrier, to name a few non-limiting examples. Preferably, the at least one further detection means is connected to the control means via an interface.

A further preferred embodiment is characterized in that the arrangement data is indicative of a height of the packages arranged on the at least one receiving surface and that the control means winds up the winding roll after unwinding until a target height is reached. In particular, the winding roll is unwound for the minimum duration and then wound up until the packages arranged on the receiving surface have reached the target height. This enables an ergonomically comfortable use for an operator. Furthermore, this ensures that additional packages can be picked up and the combination of unwinding and rewinding of the winding roll ensures a vibrating movement, whereby an improved distribution of the packages on the receiving surface can be achieved. The target height is, for example, a height that allows packages to be moved from a feed area to the receiving surface of the receiving means. It is preferred that the arrangement data is particularly indicative of the height of the packages arranged in the vicinity of the feed area. Preferably, the highest height of the packages arranged on the receiving surface in the vicinity of the feed area is taken into account.

A further preferred embodiment is characterized in that the at least one further detection means is designed as at least one further light barrier, whereby the further light barriers are arranged in such a way that packages arranged on the receiving surface interrupt the at least one further light barrier when the target height is exceeded. In this way, the receiving means can be wound up reliably by means of the winding roll until the packages arranged on the receiving surface interrupt the further light barrier and the target height has thus been reached. Preferably, the additional light barrier comprises at least one light transmitter and at least one light receiver. It is also possible that the additional light barrier has at least one mirror for reflecting the transmitted light. In particular, it is preferred that the axis formed by the further light barrier runs essentially orthogonal to a conveying direction of the device and/or runs essentially parallel to the axis of the first light barrier.

According to a further preferred embodiment, the receiving means is designed as a belt, in particular as a conveyor belt or as a modular chain. The belt is, for example, at least partially made of polypropylene, polyester and/or polyamide and is elastic. By means of such a belt, a convexly curved receiving surface can be provided in a structurally favorable manner. The belt also has sufficient strength so that a sufficient number of packages can be arranged on the belt or on the receiving surface of the belt. The modular chain can, for example, have individual chain links that are rotatably connected to each other, whereby a convex curvature of the receiving surface of the receiving means can be provided by means of the modular chain.

A further preferred embodiment is characterized in that a feed area is located upstream of the receiving means, whereby at least one conveying element for transporting the packages from the conveyor line to the receiving means is arranged at least partially in the feed area. This enables reliable transportation of the packages from the conveyor line to the receiving means or the receiving surface of the receiving means. The at least one conveyor element is preferably designed as a conveyor roller, whereby the conveyor roller can be rotated, for example. In particular, a plurality of conveyor rollers is provided, which can be driven by means of a motor and extend essentially orthogonally to a conveying direction of the device. According to a further preferred embodiment, the conveyor rollers can be driven in a coordinated manner, so that the arrangement of the packages can be controlled taking into account the arrangement data on the receiving means. It is also possible that the at least one conveying element is formed as a chute.

Furthermore, it is preferred that the at least one first detection means is arranged at least partially in the feed area for detecting the inflow data. This makes it possible to reliably determine inflow data indicative of the inflow of packages to the receiving means, since the packages are fed to the receiving means via the feed area. It is preferred here that the at least one first detection means is arranged in an end area of the feed area assigned to the receiving means.

A further preferred embodiment is characterized in that the receiving means and at least one of the at least two fastening elements are designed to be at least partially foldable in order to reduce the required footprint of the device and for transporting the device. For this purpose, the at least one fastening element can be folded in towards the other fastening element, for example by means of a curved profile. Furthermore, it is preferred that the lateral housing walls of the device are designed to be foldable or pivotable by means of hinges. This enables a flexible and movable arrangement of the device, even when space is limited.

According to a further preferred embodiment, a weight sensor detects the weight of packages arranged on the receiving surface and the control means changes the receiving surface depending on the weight determined by the weight sensor. This enables further adjustment of the receiving surface depending on the weight of the packages arranged on the receiving surface. Particularly in the case of an elastic design of the receiving means, the weight of the packages also influences the height at which the packages are made available to an operator for removal, so that this can be taken into account by the arrangement of a weight sensor.

According to a second aspect, the present invention relates to a method for storing packages, in particular parcels, preferably by means of a device according to the first aspect, in which inflow data indicative of the inflow of packages to a receiving means is detected and in which a receiving surface of the receiving means is unwound and/or wound up depending on the measured inflow data. The advantages and embodiments mentioned in relation to the device for storing packages also apply equally to the aforementioned method.

According to a preferred embodiment, the receiving surface of the receiving means is unwound for a minimum period of time when a package is fed in, and the receiving surface is wound up after unwinding until the packages arranged on the receiving surface reach a target stack height. This enables reliable regulation of the receiving surface.

The above-described embodiments and exemplary embodiments of all aspects of the present invention, which in principle initially stand alone, are also to be understood as disclosed in all combinations with one another.

Further advantageous exemplary embodiments of the invention can be found in the following detailed description of some exemplary embodiments of the present invention, in particular in connection with the figures. However, the figures accompanying the application are intended only for the purpose of clarification, but not for determining the scope of protection of the invention. The accompanying drawings are not necessarily to scale and are merely intended to reflect the general concept of the present invention by way of example. In particular, features contained in the figures are in no way to be considered a necessary part of the present invention.

BRIEF DESCRIPTION OF THE DRAWINGS

The invention is explained in more detail below with reference to drawings showing embodiments. They show schematically in each case.

DETAILED DESCRIPTION

Figure 1:
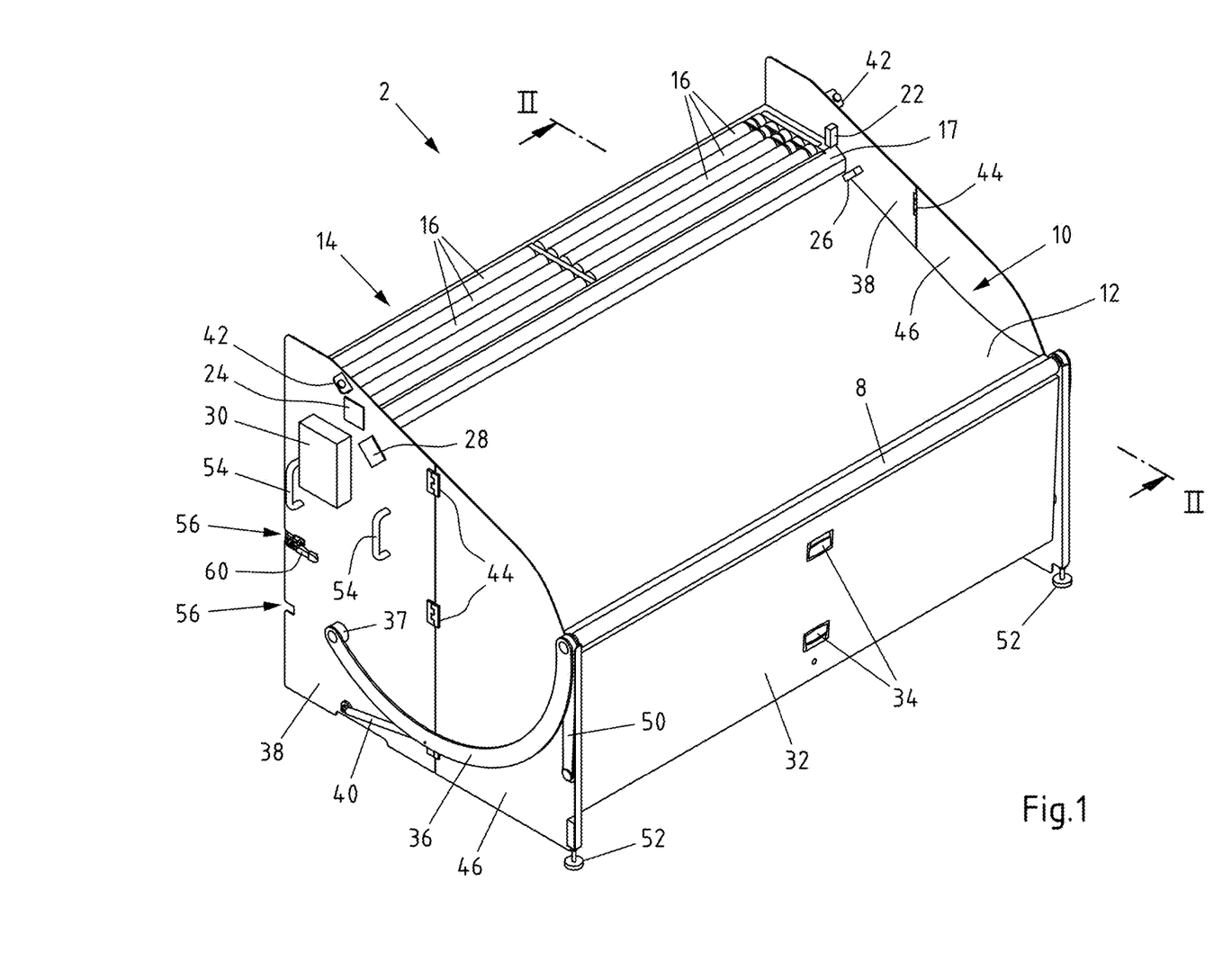
FIG. 1 is a schematic view of an embodiment of a device for storing packages in a perspective view.
Figure 4:
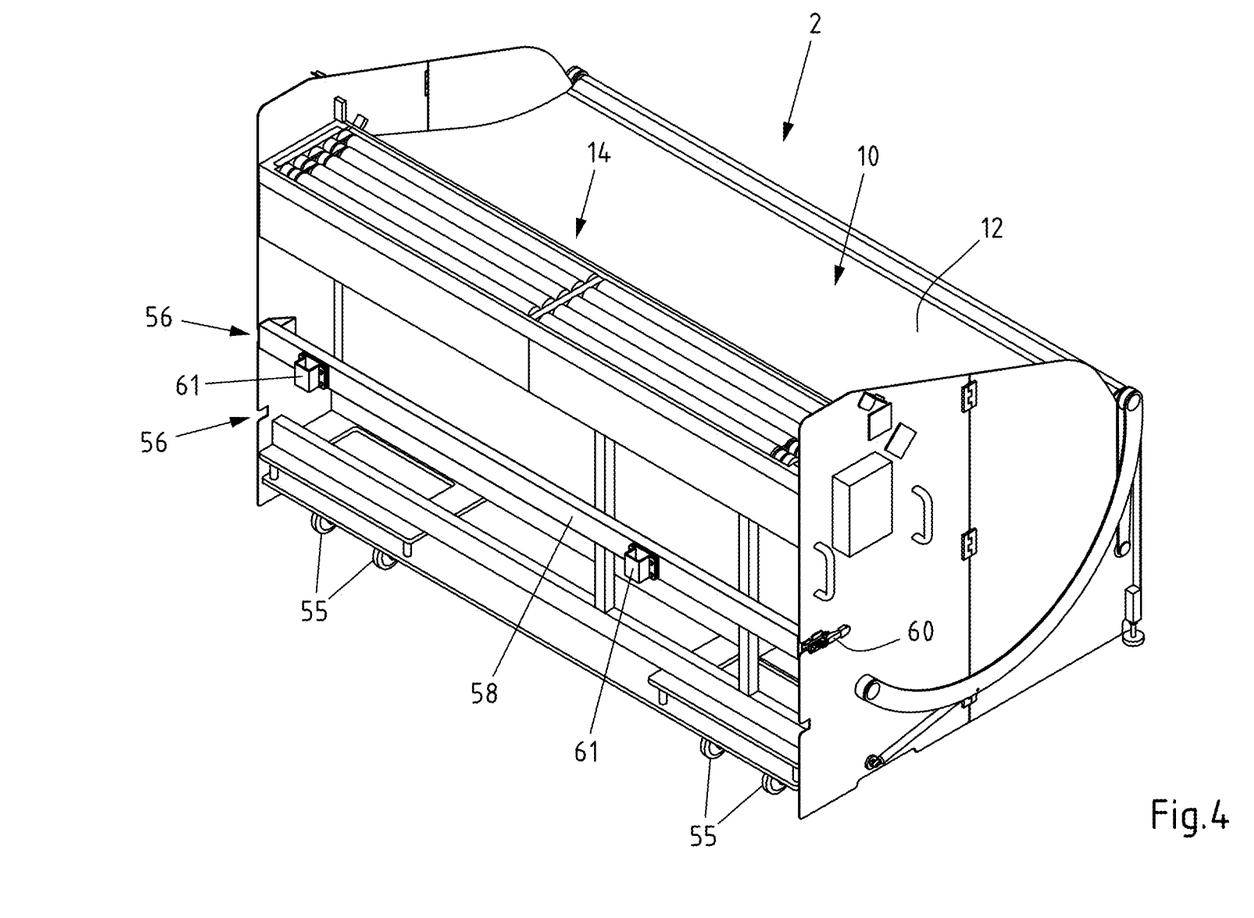
FIG. 4 is a schematic view of the embodiment of the device shown in FIG. 1 in a further perspective view.

FIGS. 1 and 4 show schematic views of an embodiment example of a device 2 for storing packages in different perspective views, wherein the device 2 is designed as a dynamic goods storage device for storing packages 4, in particular parcels.

A receiving means 10 is arranged between two fastening elements 6 and 8 (see in particular FIGS. 2 and 3 in this regard) for receiving the packages 4. In the present case, the fastening element 6 is designed as a winding roll 6, whereby the receiving means 10 can be wound onto the winding roll 6. Beforehand, the receiving means 10 is deflected by means of a deflection roller 11. The other end of the receiving means 10 is attached to the cylindrical fastening element 8. The receiving means 10 has a receiving surface 12 on which the packages 4 can be arranged. In the present case, the receiving means 10 is designed as a belt, in particular as a conveyor belt.

A feed area 14 is located upstream of the receiving means 10, the feed area 14 having a plurality of conveyor elements 16 for conveying the packages 4 from a conveyor line 18 to the receiving means 10. The conveying elements 16 are designed as driven conveyor rollers 16, each of which extends over substantially half the width of the feed area and are arranged in rows of two parallel to one another. The conveyor rollers 16 are further enclosed in a housing 17, which provides a seal between the conveyor rollers 16 and the receiving means 10.

The feed area 14 is delimited in the direction of the receiving means 10 by a first detection means 22, which in the present case is designed as a light barrier 22 comprising a light transmitter and a light receiver. A mirror 24 for reflecting the light barrier 22 is also formed opposite the first detection means 22. The inflow of packages 4 to the receiving means 10 can be detected by means of the light barrier 22. In particular, it is possible to determine the number of packages 4 flowing to the receiving means 10.

Downstream of the first detection means 22 is a further detection means 26, with the aid of which arrangement data can be detected indicatively for the arrangement of packages 4 arranged on the receiving surface 12 of the receiving means 10. For this purpose, the further detection means 26 is designed as a light barrier 26 comprising a light transmitter and a light receiver. A mirror 28 for reflecting the light barrier 26 is also formed opposite the further detection means 26. In particular, the light barrier 26 can be used to detect if the packages 4 arranged on the receiving surface 12 exceed a certain height, preferably a certain height in the vicinity of the feed area 14, in particular a target height.

To control the device 2, the device 2 has a control means 30, with the aid of which the winding roll 6 can be rolled up and/or unrolled depending on the data measured by the detection means 22 and the detection means 26. When the winding roll 6 is unwound, the receiving means 10 is unwound, which increases the receiving surface 12. Accordingly, rolling up the winding roll 6 leads to a rolling up of the receiving means 10, whereby the receiving surface 12 is reduced.

Figure 5:
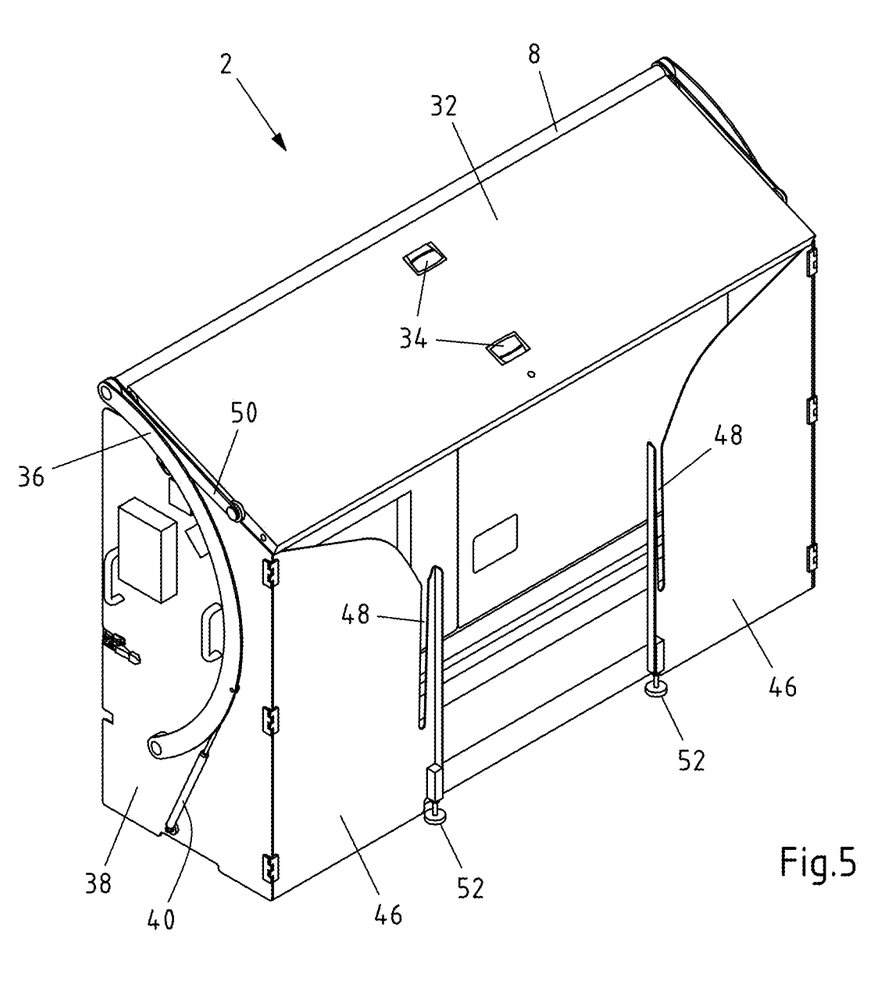
FIG. 5 is a perspective view of the embodiment shown in FIG. 1 in a folded state.

The fastening element 8 is connected to a rear wall 32, the rear wall having two grip elements 34 for better handling. The fastening element 8 together with the rear wall 32 is designed to be foldable in order to reduce the required footprint of the device 2 and to simplify transportation of the device 2. A folded-in state of the device 2 is shown as an example in FIG. 5. For pivoting the fastening element 8 and the rear wall 32, the rear fastening element 8 is pivotably connected on both sides in each case to a curved profile 36, the curved profile 36 also being pivotably fastened to a front side wall part 38 of the device. The two curved profiles 36 are connected to each other via a shaft 37 for increased stability and for synchronization, for example in a rotationally fixed manner. The curved profile 36 is also connected to a gas pressure spring 40 attached to the side wall part 38, which enables simplified folding of the device 2.

The side wall part 38 has a stop means 42 against which the folded rear wall 32 can rest. A side door element 46, which is pivotably attached by means of hinges 44 and which can be pivoted in the direction of the receiving element 10 when the device 2 is folded up, also adjoins the side wall part 38. The side door element 46 has a substantially elongate receptacle 48 (see FIG. 5), by means of which a bar 50 arranged laterally on the rear wall 32 can be positively connected to the side door element 46. The side door elements 46 have rotatable foot parts 52 for supporting the side door elements 46.

Handle elements 54 are arranged on the side wall parts 38, which, in combination with the roller units 55, ensure convenient movement of the device 2. Recesses 56 are arranged on the end face of the side wall parts 38, by means of which a crossbeam 58 can be fastened to the device 2. The attachment between the crossbeam 58 and the device 2 is ensured in the present case, for example, by means of hinge elements 60 engaging in the recesses 56. The height of the crossbeam 58 can be adjusted via the other recesses 56.

The crossbeam 58 is used to connect the device 2 to the longitudinal struts 19 of the conveyor line 18. For this purpose, for example, O-profile elements 61 are arranged on the crossbeam 58 in the direction of the end face of the conveyor line 18.

Figure 2:
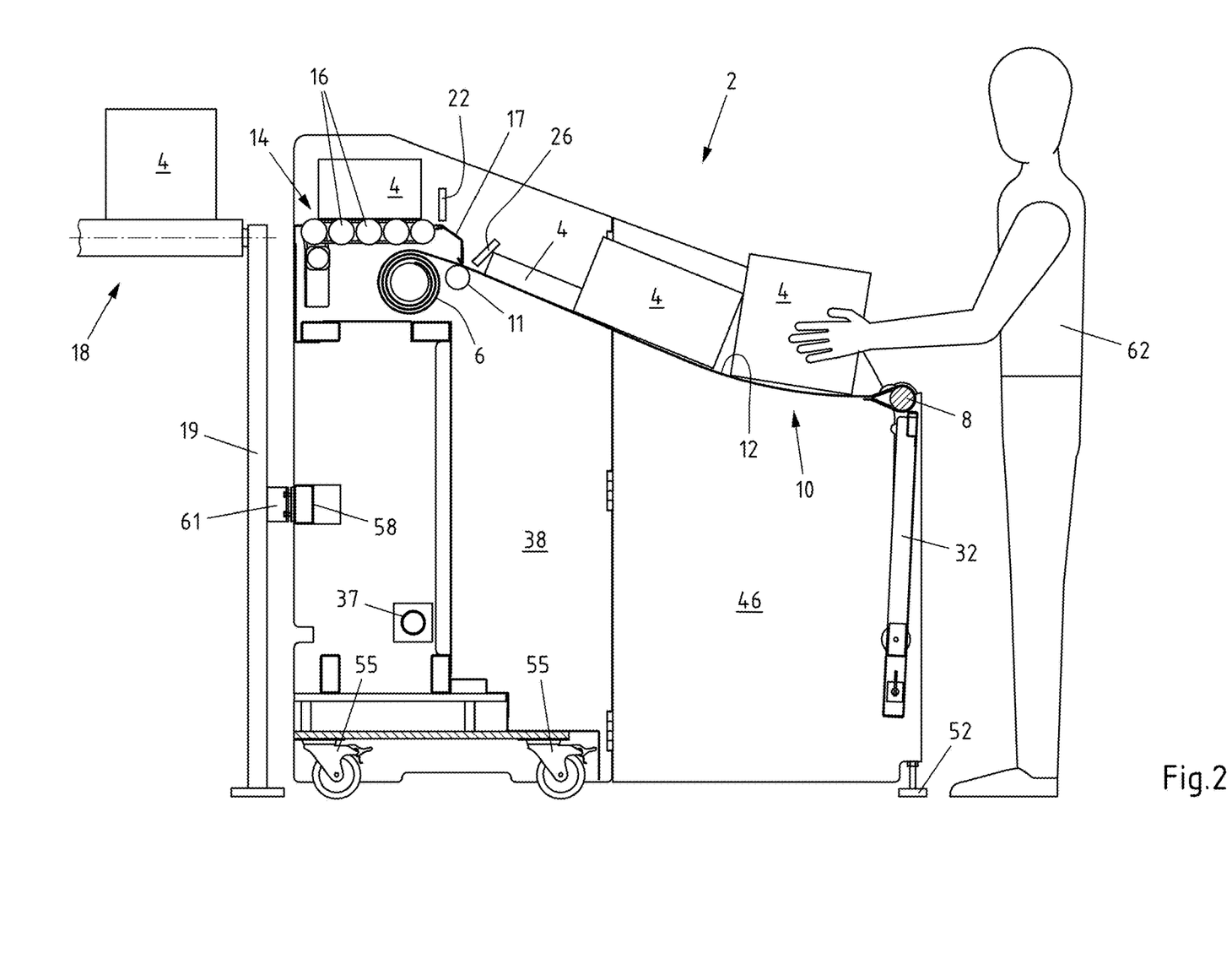
FIG. 2 is a sectional view along the section shown in FIG. 1 of the first embodiment of the device in a first loading state.
Figure 3:
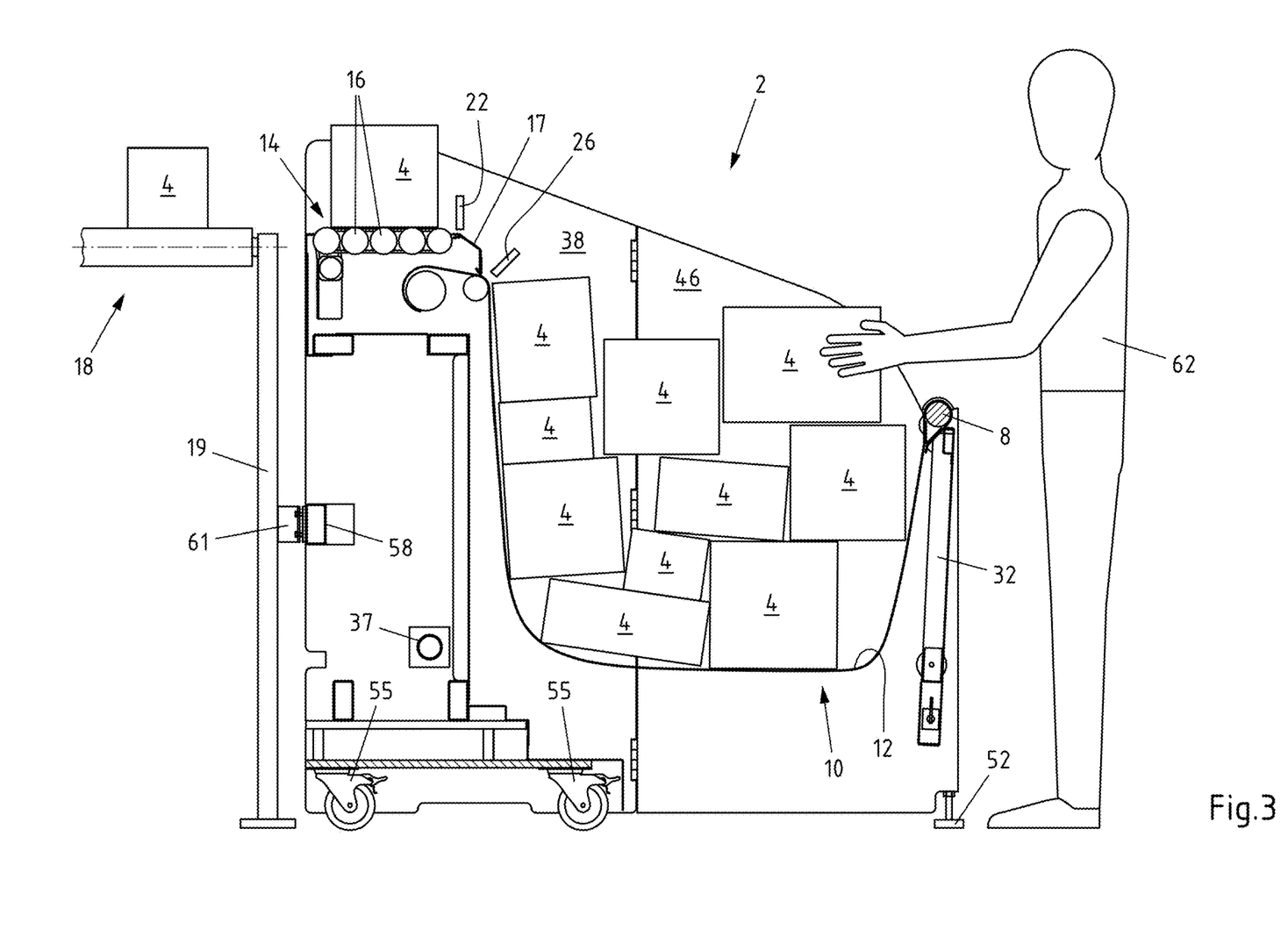
FIG. 3 is the sectional view of the first embodiment of the device shown in FIG. 2 in a second loading state.

The mode of operation of the device 2 for storing packages is shown by way of example in FIGS. 2 and 3. FIG. 2 shows a sectional view along the section of the first embodiment example of the device 2 shown in FIG. 1 in a first loading state. As shown, a total of three packages 4 are arranged on the receiving surface 12 of the receiving means 10, one package 4 is located in the feed area 14 and a further package 4 is arranged on the conveyor line 18. Since a small number of packages 4 are arranged on the receiving surface 12 of the receiving means 10, the receiving means 10 arranged on the winding roll 6 is only slightly unrolled, so that a slight convex curvature of the receiving means 10 is recognizable. This allows the operator 62 to remove the individual packages 4 at an ergonomically comfortable height.

If a further package 4 now flows to the receiving surface 12, the inflow of the package 4 is detected by the light barrier 22 and forwarded to the control means 30 by means of a cable or wirelessly. In response to the inflow of a package 4, the control means 30 unwinds the winding roll 6 for a certain minimum duration, for example. In this case, it is preferred that the control means 30 only unwinds the winding roll 6 if the light barrier 22 has also been interrupted for a certain interruption period in order to prevent the unwinding of the winding roll 6 and thus also of the receiving means 10 from being triggered incorrectly.

After the winding roll 6 has unwound the receiving means 10 for a minimum duration, the winding roll 6 preferably winds the receiving means 10 until a target height of the packages 4 arranged on the receiving means 10 in the vicinity of the feed area 14 has been detected by means of the further detection means 26. In the present case, the further detection means 26 is arranged in the vicinity of the feed area 14 of the device 2. However, it is also possible to arrange the further detection means 26 at a different location.

By winding the winding roll 6 until a target height is reached, the packages can be reliably and ergonomically removed by the operator 62 at a defined height. The winding and unwinding of the winding roll 6 also triggers a vibrating movement when a package 4 is fed to the receiving surface 12, which enables space-saving distribution of the packages 4 on the receiving surface 12.

FIG. 3 shows the sectional view of the first embodiment of the device 2 shown in FIG. 2 in a second loading state. It can be seen that the unwinding of the winding roll 6 can provide a significantly enlarged receiving surface 12 of the receiving means 10 and thus an increased number of packages 4 can be stored in a space-saving manner by means of the device 2. This enables ergonomic removal by the operator 62 even with a large quantity of stored packages 4.

The exemplary embodiments/examples of the present invention described in this specification are to be understood as disclosed both individually and in all combinations with each other. In particular, the description of a feature encompassed by an embodiment—unless explicitly stated to the contrary—should not be understood herein to mean that the feature is indispensable or essential for the function of the exemplary embodiment. The sequence of the process steps described in this specification in the individual flowcharts is not mandatory; alternative sequences of the process steps are conceivable. The process steps can be implemented in various ways, for example, implementation in software (by program instructions), hardware or a combination of both is conceivable for implementing the process steps.

Terms used in the patent claims such as "comprising", "comprising", "comprising", "containing" and the like do not exclude further elements or steps. The phrase "at least in part" includes both the case of "in part" and the case of "completely". The wording "and/or" is to be understood as meaning that both the alternative and the combination are to be disclosed, i.e. "A and/or B" means "(A) or (B) or (A and B)". A plurality of entities, persons or the like in the context of this specification means a plurality of entities, persons or the like. The use of the indefinite article does not preclude a plurality. A single device may perform the functions of several units or devices mentioned in the claims. Reference signs indicated in the patent claims are not to be regarded as limitations of the means and steps used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A device for storing packages, in particular parcels, for arrangement on a conveyor line, comprising:
at least one receiving means arranged at least partially between at least two fastening elements, wherein the receiving means having at least one receiving surface for arranging the packages on the receiving surface,
at least a first detection means for measuring inflow data indicative of an inflow of packages to the receiving means, and
at least one control means for controlling a change of the at least one receiving surface,
wherein the at least one control means changes the at least one receiving surface of the at least one receiving means depending on the inflow data measured by the at least one first detection means, and wherein:
at least a first of the at least two fastening elements is designed as a winding roll, the receiving means being at least partially windable on the winding roll, and
the at least one control means unwinds the winding roll for a minimum duration.

2. The device according to claim 1, wherein:
the control means changes the at least one receiving surface of the at least one receiving means by unwinding and/or winding the winding roll.

3. The device according to claim 2, wherein:
the inflow data comprise the number of inflowing packages, and
the at least one control means unwinds the at least one winding roll for a minimum duration when the number of packages fed increases.

4. The device according to claim 3, wherein:
the at least one first detection means is designed as at least one first light barrier, the packages interrupting the at least one first light barrier when the packages flow to the at least one receiving means, and
from an interruption duration of the first light barrier of more than 0.1 seconds, in particular of more than 0.25 seconds, particularly preferably of more than 0.5 seconds, the at least one control means unwinds the at least one unwinding roll to enlarge the receiving surface.

5. The device according to claim 1, wherein:
the device furthermore has at least one further detection means for detecting arrangement data indicative of the arrangement of packages arranged on the receiving surface, and
the at least one control means additionally changes the at least one receiving surface of the at least one receiving means depending on the arrangement data measured by the at least one further detection means.

6. The device according to claim 5, wherein:
the arrangement data is indicative of a height of the packages arranged on the at least one receiving surface, and
the control means wind up the winding roll after unwinding until a target height is reached.

7. The device according to claim 6, wherein:
the at least one further detection means is designed as at least one further light barrier, the further light barrier being arranged in such a way that packages arranged on the receiving surface interrupt the at least one further light barrier when the target height is exceeded.

8. The device according to claim 1, wherein:
the receiving means is designed as a belt, in particular as a conveyor belt, or as a modular chain.

9. The device according to claim 1, wherein:
a feed region is arranged upstream of the receiving means, at least one conveying element for conveying the packages from the conveyor line to the receiving means being arranged at least partially in the feed region.

10. The device according to claim 9, wherein:
the at least one first detection means is arranged at least partially in the feed region for detecting feed data.

11. A method for storing packages, in particular parcels, preferably by means of a device according to claim 1, comprising:
measuring inflow data indicative of an inflow of packages to a receiving means, and
unwinding and/or winding up a receiving surface of the receiving means as a function of the measured inflow data, and
unwinding the receiving surface of the receiving means for a minimum period of time when a package flows in.

12. The method according to claim 11, further comprising:
winding up the receiving surface after unwinding until the packages arranged on the receiving surface reaches a target height.

13. A device for storing packages, in particular parcels, for arrangement on a conveyor line, comprising:
at least one receiving means arranged at least partially between at least two fastening elements, wherein the receiving means having at least one receiving surface for arranging the packages on the receiving surface,
at least a first detection means for measuring inflow data indicative of an inflow of packages to the receiving means, and
at least one control means for controlling a change of the at least one receiving surface,
wherein the at least one control means changes the at least one receiving surface of the at least one receiving means depending on the inflow data measured by the at least one first detection means, and
wherein:
the receiving means and at least one of the at least two fastening elements are designed to be at least partially foldable in order to reduce the required footprint of the device and for transportation of the device.

14. A device for storing packages, in particular parcels, for arrangement on a conveyor line, comprising:
at least one receiving means arranged at least partially between at least two fastening elements, wherein the receiving means having at least one receiving surface for arranging the packages on the receiving surface,
at least a first detection means for measuring inflow data indicative of an inflow of packages to the receiving means, and
at least one control means for controlling a change of the at least one receiving surface,
wherein the at least one control means changes the at least one receiving surface of the at least one receiving means depending on the inflow data measured by the at least one first detection means, and
wherein:
a weight sensor detects the weight of packages arranged on the receiving surface, and
the control means changes the receiving surface depending on the weight determined by the weight sensor.

* * * * *